(No Model.)

J. E. LOUGHRIDGE.
BRAKE MECHANISM FOR RAILWAY CARS.

No. 433,294. Patented July 29, 1890.

Witnesses:
E. Elterich
R. Schleicher

Inventor:
Jacob E. Loughridge
by his Attorneys
Howsen & Howsen

UNITED STATES PATENT OFFICE.

JACOB E. LOUGHRIDGE, OF PHILADELPHIA, PENNSYLVANIA, ASSIGNOR TO THE LOUGHRIDGE BRAKE AND CAR COMPANY, OF CAMDEN, NEW JERSEY.

BRAKE MECHANISM FOR RAILWAY-CARS.

SPECIFICATION forming part of Letters Patent No. 433,294, dated July 29, 1890.

Application filed December 9, 1889. Serial No. 333,028. (No model.)

*To all whom it may concern:*

Be it known that I, JACOB E. LOUGHRIDGE, a citizen of the United States, and a resident of Philadelphia, Pennsylvania, have invented certain Improvements in Braking Mechanism for Railroad-Cars, of which the following is a specification.

The object of my invention is to provide a simple form of device for automatically taking up the slack in railroad-car brakes, whether such slack be due to the wearing of the brake-shoes or to the wearing, stretching, or "spring" of any part of the brake-applying gear, the device being applicable to the forms of brake-gear at present in use, whether operated by hand or power, without material change in any of the parts of said gear.

Figure 1:
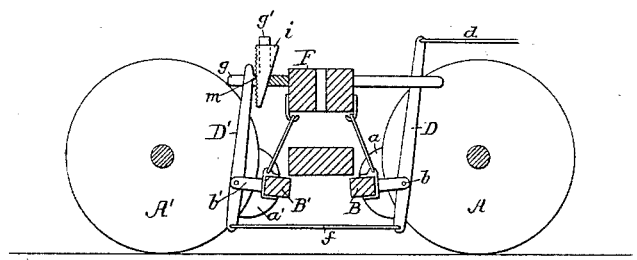
Figure 2:
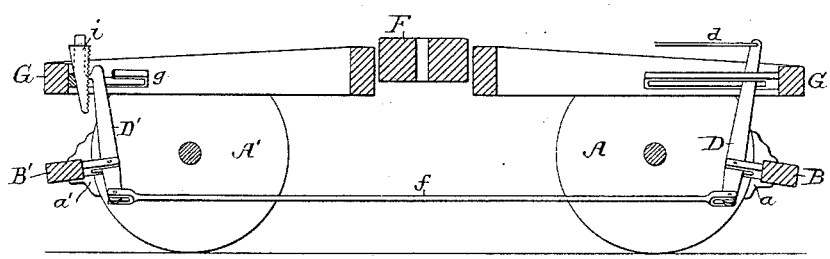
Figure 3:
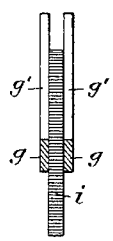
Figure 4:
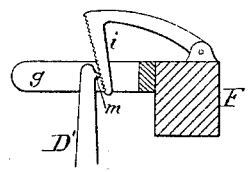
Figure 5:
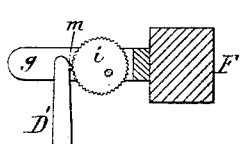
Figure 6:
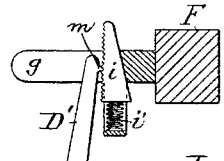

In the accompanying drawings, Figure 1 is a diagram illustrating the application of my invention to an ordinary form of brake-gear, such as is used on freight-cars. Fig. 2 is a similar diagram showing the application of my invention to an ordinary form of passenger-car brake-gear. Fig. 3 is an enlarged transverse section on the line 1 2, Fig. 1; and Figs. 4, 5, and 6 are views illustrating other means of carrying out my invention.

In both of the forms of the brake-gear shown, A A' represent the two wheels at one side of the truck and B B' the two brake-beams suspended from the truck, as usual, and carrying the brake-shoes $a$ $a'$, respectively, the shoe $a$ acting on the wheel A and the shoe $a'$ on the wheel A'.

Hung to a bracket $b$ on the brake-beam B is what is known as the "live" lever D of the brake-gear, the long arm of this lever being connected by a rod $d$ to the brake-operating device, either hand or power, and the short arm of the lever being connected by a rod $f$ to the short arm of a lever D', known as the "dead" lever, which is hung to a bracket $b'$ on the brake-beam B', and is fulcrumed at its upper end in a slotted bracket $g$, which in the case of the truck shown in Fig. 1 is secured to and projects from the bolster F, and in the case of the truck shown in Fig. 2 is carried by one of the sills G of the truck.

Usually this dead-lever is hung to the bracket $g$ by means of a pivot-pin, which can be adapted to any one of a number of openings in said bracket, the pin being removed, the lever readjusted, and the pin applied to an opening of the bracket in advance of that which it before occupied when it becomes necessary to take up slack in the brake-gear, due either to the wearing of the shoes or to the wear, spring or "give" of any of the parts of the brake-operating mechanism. In order to dispense with the necessity for this frequent readjustment of the dead-lever, I discard the usual plan of pivoting the same to a pin carried by the bracket, and provide a compensating bearing for the upper end of the lever, that shown in Figs. 1 and 2 consisting of a gravitating wedge-block $i$, which is preferably interposed between a bearing-lug $m$ on the lever and that end of the bracket $g$ adjacent to the bolster or sill to which said bracket is secured, this gravitating block being retained laterally by guide-arms $g'$ on the bracket, as shown in Fig. 3, for instance, but being free to move vertically through the slot in the bracket to an extent permitted by the free or loose movement of the dead-lever— that is to say, as soon as there is any slack in any of the parts of the brake-gear—which will permit the upper end of the dead-lever to move in the direction of the arrow under the constant jolting to which it is subjected by the movement of the truck, the gravitating block will fall and thus advance the fulcrum or point of bearing of the lever to the extent of such movement, thus providing a constantly acting and automatic device for taking up whatever slack there may be in any part of the brake-operating gear, so that the extent of pull upon the rod $d$ necessary to apply the brake is the same under all circumstances. That face of the block $i$ which serves as the bearing for the lug $m$ of the lever is preferably roughened or fluted, so that the pressure of the lug upon this fluted or roughened face will prevent the rise of the block due to the jarring of the same or to its wedge form.

Although the gravitating wedge interposed between the upper end of the dead-lever and the base of the slotted bracket is the preferred form of compensating bearing for the dead-lever, other forms of take-up may be employed—for instance, an eccentric arm hung to the sill or bolster and constituting the bearing for the lever may be employed, as shown in Fig. 4, or an eccentric or cam block hung to the bracket itself may be used, as shown in Fig. 5, and instead of using a gravitating block a block having a constant tendency to rise under the action of a suitable spring $i'$ may be used, as in Fig. 6, and the spring may be used to cause or assist the movement of the eccentric or cam arms or blocks, such as shown in Figs. 4 and 5, or of the wedge-blocks shown in Figs. 1 and 2.

Having thus described my invention, I claim and desire to secure by Letters Patent—

1. The combination of the dead-lever of railway-car-brake mechanism, with a wedge block or plate serving as a bearing for the fulcrum end of said lever and loosely mounted so that its bearing-face travels in a plane inclined in respect to the line of the lever, whereby it has a constant tendency to follow and hold any advance in the position of the fulcrum end of said lever, substantially as specified.

2. The combination of the dead-lever of railway-car-brake mechanism with a gravitating take-up constituting the bearing for the fulcrum end of said dead-lever, substantially as specified.

3. The combination of the dead-lever of railway-car-brake mechanism, a guiding-bracket for the fulcrum end of the same, and a graduated take-up block interposed between the lever and the end of the bracket and having a constant tendency to follow and hold any advance in the position of the fulcrum end of the lever, substantially as specified.

4. The combination of the dead-lever of railway-car-brake mechanism having a fulcrum-lug with a compensating bearing for said fulcrum-lug of the lever, substantially as specified.

5. The combination of the dead-lever of railway-car-brake mechanism having a fulcrum-lug with a compensating bearing for said lug having a roughened face, substantially as specified.

6. The combination of the dead-lever of railway-car-brake mechanism, a compensating bearing-block for the fulcrum end of said lever, and a bracket constituting a guide for the lever and having arms serving as guides for the bearing-block, substantially as specified.

In testimony whereof I have signed my name to this specification in the presence of two subscribing witnesses.

JACOB E. LOUGHRIDGE.

Witnesses:
WILLIAM D. CONNER,
HARRY SMITH.